United States Patent
Keller et al.

(10) Patent No.: US 7,200,233 B1
(45) Date of Patent: Apr. 3, 2007

(54) SYSTEM AND METHOD FOR FAST DATA ENCRYPTION/DECRYPTION USING TIME SLOT NUMBERING

(75) Inventors: Merle L. Keller, Salt Lake City, UT (US); Vaughn L. Mower, Bountiful, UT (US); Steve J. McEntire, Salt Lake City, UT (US); Victor D. Albertini, Salt Lake City, UT (US)

(73) Assignee: L-3 Communications Corporation, New York, NY (US)

( * ) Notice: Subject to any disclaimer, the term of this patent is extended or adjusted under 35 U.S.C. 154(b) by 854 days.

(21) Appl. No.: 10/316,655

(22) Filed: Dec. 10, 2002

(51) Int. Cl.
*H04L 9/00* (2006.01)
*G06F 11/30* (2006.01)
*G06F 12/14* (2006.01)

(52) U.S. Cl. ..................... 380/268; 713/189
(58) Field of Classification Search ............... 380/28
See application file for complete search history.

(56) References Cited

U.S. PATENT DOCUMENTS

| | | | |
|---|---|---|---|
| 4,218,582 A | 8/1980 | Hellman et al. | 178/22 |
| 4,351,982 A | 9/1982 | Miller et al. | 178/22.11 |
| 5,598,154 A * | 1/1997 | Wilson et al. | 341/50 |
| 5,850,450 A | 12/1998 | Schweitzer et al. | 380/30 |
| 5,940,765 A * | 8/1999 | Haartsen | 455/462 |
| 6,151,395 A | 11/2000 | Harkins | 380/286 |
| 2002/0018669 A1* | 2/2002 | Gack | 399/170 |

* cited by examiner

*Primary Examiner*—Kambiz Zand
*Assistant Examiner*—Christopher J. Brown
(74) *Attorney, Agent, or Firm*—Harrington & Smith, PC (57) ABSTRACT

A system for fast data encryption/decryption is provided. The system includes a transmitter system having a transmitter direct digital synthesizer (DDS). The DDS includes at least three transmitter pseudo-noise (PN) component code generators $PN_x$, $PN_y$, $PN_z$, where each transmitter PN component code generator is adapted to generate relatively prime transmitter PN component codes when compared with each of the other transmitter PN component code generators. The transmitter also includes a first processor coupled to the transmitter DDS, where the first processor is adapted to determine a time slot number (TSN) relative to at least two of the relatively prime transmitter PN component codes. Also included in the transmitter is an encryptor for encrypting clear data in accordance with the TSN. The system includes a receiver system having a second processor adapted to determine the TSN; and a decryptor coupled to the second processor. The decryptor is adapted to decrypting the encrypted clear data in accordance with the TSN.

37 Claims, 7 Drawing Sheets

SYSTEM AND METHOD FOR FAST DATA ENCRYPTION/DECRYPTION USING TIME SLOT NUMBERING

FIELD OF THE INVENTION

This invention relates to encryption and decryption in communication systems using spread spectrum PN coding techniques and, more particularly, to encryption/decryption systems using time division (TD) time slot numbering.

BACKGROUND OF THE INVENTION

Time division multiple access (TDMA) is a communications system that divides a single frequency channel into short-duration time slots to enable multiple users to transmit on the same channel.

Hybrid TD—Spread Spectrum (SS) or TDMA-SS transmission systems employ a succession of short-duration PN encoded data bursts emanating from one or more communication stations.

Spread spectrum (SS) systems, which may be CDMA systems, are well known in the art. SS systems can employ a transmission technique in which a pseudo-noise (PN) PN-code is used as a modulating waveform to spread the signal energy over a bandwidth much greater than the signal information bandwidth. At the receiver the signal is despread using a synchronized replica of the PN-code.

In general, there are two basic types of SS systems: direct sequence spread spectrum systems (DSSS) and frequency hop spread spectrum systems (FHSS).

The DSSS systems spread the signal over a bandwidth $f_{RF} \pm R_c$, where $f_{RF}$ represents the carrier frequency and $R_c$ represents the PN-code chip rate, which in turn may be an integer multiple of the symbol rate $R_s$. Multiple access systems employ DSSS techniques when transmitting multiple channels over the same frequency bandwidth to multiple receivers, each receiver sharing a common PN code or having its own designated PN-code. Although each receiver receives the entire frequency bandwidth, only the signal with the receiver's matching PN-code will appear intelligible; the rest appears as noise that is easily filtered. These systems are well known in the art and will not be discussed further.

FHSS systems employ a PN-code sequence generated at the modulator that is used in conjunction with an m-ary frequency shift keying (FSK) modulation to shift the carrier frequency $f_{RF}$ at a hopping rate $R_h$. A FHSS system divides the available bandwidth into N channels and hops between these channels according to the PN-code sequence. At each frequency hop time a PN generator feeds a frequency synthesizer a sequence of n chips that dictates one of 2n frequency positions. The receiver follows the same frequency hop pattern. FHSS systems are also well known in the art and need not be discussed further. In many situations using CDMA or TDMA-SS, particularly military situations, data communications are encrypted by the sender and decrypted by the receiver. Decryption by the receiver requires that the receiver have a decryption key. The key may be private or public.

One method of public-key encryption, developed by Rivest, Shamir & Adelman, and generally referred to as RSA, is based upon the use of two large prime numbers which fulfill the criteria for the "trap-door, one-way permutation." Such a permutation function enables the sender to encrypt the message using a non-secret encryption key, but does not permit an eavesdropper to decrypt the message by crypto-analytic techniques.

As described in U.S. Pat. No. 4,354,982 to Miller et al., public-key encryption is useful for transmitting periodic changes in encryption keys on open channels. In the public-key encryption method, the need for a master encryption key in which to encrypt the periodic changes of the standard key is avoided. Thus, the need to transmit over a secure channel, or to physically transport the master key by courier or the like, is avoided. Without public-key encryption, each user must have the master key. Though the master key does not change often, as each new user comes on the data encryption line, a master key must be sent in some secure manner to that user. Each such transfer, even over a secure channel or by physical hand delivery, could be compromised, thus necessitating changing the master key for all users.

Public-key encryption enables the standard keys, which change periodically, to be sent over open channels to each user with a publicly known public-key, which though publicly known, is not capable of decryption by anyone other than the individual user.

Generally, the RSA public-key system has the following features. Assuming that the receiver of the message is located at terminal A, terminal A will have first computed two very large random prime numbers p, q. The product of p and q is then computed and constitutes the value n. A large random integer e is then selected which has the property that the greatest common divisor (GCD) of e, and the product of (p−1) and (q−1) is 1. Stated in equation form:

$$GCD[e,(p-1)(q-1)]=1 \tag{Eq. 1A}$$

where: e is a large random integer which is relatively prime to the product of (p−1) and (q−1). An integer d is then computed which is the "multiplicative inverse" of e in modulo (p−1) (q−1):

$$e*d \equiv 1[\bmod(p-1)(q-1)] \tag{Eq. 2A}$$

Terminal A transmits n and e to another terminal, e.g., Terminal B, in clear text without encryption, or a public list of n and e for every terminal, including Terminal A, is made publicly known. Terminal B responds by encrypting and transmitting a message M into an encrypted transmission C as follows:

$$C \equiv E(M) \equiv M^e \pmod{n} \tag{Eq. 3A}$$

Terminal B then sends the encrypted message C. Terminal A then performs an operation upon the received encoded message C as follows:

$$M = (C)^d \pmod{n} \tag{Eq. 4A}$$

Due to the properties of the selected large random prime numbers this "open trap-door, one-way permutation" results in the identical message M.

An interceptor who receives, or otherwise knows the publicly transmitted n and e, cannot easily decode the message sent by terminal B without the number d. Thus, the transmission from Terminal B to Terminal A is secure against decryption by unauthorized recipients.

However, as is known in the art, there exists factoring algorithms such as the Schroeppel algorithm, for factoring the number n. For an n of e.g., 50 digits in length, the Schroeppel algorithm can be used to factor n in 3.9 hours, on a large-scale digital computer.

It will be appreciated by those skilled in the art that message security is measured, or determined, by the amount of time it would take an unauthorized user to decrypt a message using techniques such as factoring. A one thousand year period in which to factor the value of n using factoring techniques is generally accepted as completely secure. It will be appreciated therefore, that the random numbers p and q must be extremely large. For the public-key system, the digit length of n is generally one hundred digits; and the corresponding digit length of p and q are each approximately sixty digits. It can be readily understood that generating random prime numbers sixty digits in length requires several hours on commercially available microprocessors.

It is therefore desirable to provide a fast encryption/decryption method and system whereby information may be encrypted/decrypted using public and/or master keys less susceptible to compromise but quickly determined by authorized or intended users.

SUMMARY OF THE INVENTION

The foregoing and other problems are overcome, and other advantages are realized, in accordance with the presently preferred embodiments of these teachings.

In accordance with one embodiment of the present invention, a system for fast data encryption/decryption, is provided. The system includes a transmitter system having at least three transmitter pseudo-noise (PN) component code generators $PN_x$, $PN_y$, $PN_z$, wherein each transmitter PN component code generator is adapted to generate relatively prime transmitter PN component codes when compared with each of the other transmitter PN component codes. The transmitter also includes a first processor adapted to determine a time slot number (TSN) relative to at least two of the relatively prime transmitter PN component codes. Also included in the transmitter is an encryptor for encrypting clear data in accordance with the TSN.

The system includes a receiver system having a second processor adapted to determine the TSN; and a decryptor coupled to the second processor. The decryptor is adapted to decrypting the encrypted clear data in accordance with the TSN.

In accordance with another embodiment of the present invention a method for fast data decryption is provided. The method includes determining a time slot number (TSN), and decrypting encrypted data associated with the TSN. Decrypting further includes decrypting in accordance with the TSN.

The invention is also directed towards a method for fast data encryption. The method includes determining a time slot number (TSN) and encrypting clear data associated with the TSN and encrypting in accordance with the TSN.

In accordance with another embodiment of the present invention an integrated circuit (IC) is provided. The IC includes at least three transmitter pseudo-noise (PN) component code generators $PN_x$, $PN_y$, $PN_z$, wherein each transmitter PN component code generator is adapted to generate relatively prime transmitter PN component codes when compared with each of the other transmitter PN component codes. The IC also includes a first processor adapted to determine a time slot number (TSN) relative to at least two of the relatively prime transmitter PN component code and an encryptor for encrypting clear data in accordance with the TSN.

In accordance with another embodiment of the invention an integrated circuit (IC) is provided. The IC includes a processor adapted to determine a time slot number (TSN); and a decryptor adapted to decrypting encrypted clear data in accordance with the TSN and coupled to the second processor.

The invention is also directed towards a program storage device readable by a machine, tangibly embodying a program of instructions executable by the machine to perform method steps for fast data decryption. The method includes determining a time slot number (TSN), wherein determining the TSN further includes determining a receiver PN composite code minor epoch, wherein the receiver PN composite code minor epoch consists of at least two receiver PN component code epochs. Determining the receiver PN composite code minor epoch further includes determining the receiver PN composite code minor epoch with sufficient lead time to identify the TSN associated with the encrypted data to be decrypted. The program storage device also includes instructions for determining a receiver TSN relative to determining the receiver PN composite code minor epoch; and decrypting encrypted data associated with the TSN relative to the receiver PN composite code, wherein decrypting further comprises decrypting in accordance with the TSN.

The invention is also directed towards a program storage device readable by a machine, tangibly embodying a program of instructions executable by the machine to perform a fast data encryption method. The method includes determining a time slot number (TSN), wherein determining the TSN includes determining a transmitter PN composite code minor epoch having at least two transmitter PN component code epochs. The method also includes determining a transmitter TSN relative to determining the transmitter PN composite code minor epoch; and encrypting in accordance with the TSN, clear data associated with the TSN.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

As disclosed herein, the present invention describes a novel method and system for determining encryption/decryption keys.

In one embodiment of the present invention, a method is presented to determine the phase position of a pseudo noise composite ($PN_c$) code. The phase position is then correlated to a time slot position in a direct sequence, spread-spectrum (DSSS) signal for TDMA (Time Domain Multiple Access) operation. The time slot position is then used to generate an encryption or decryption key.

Figure 5A:
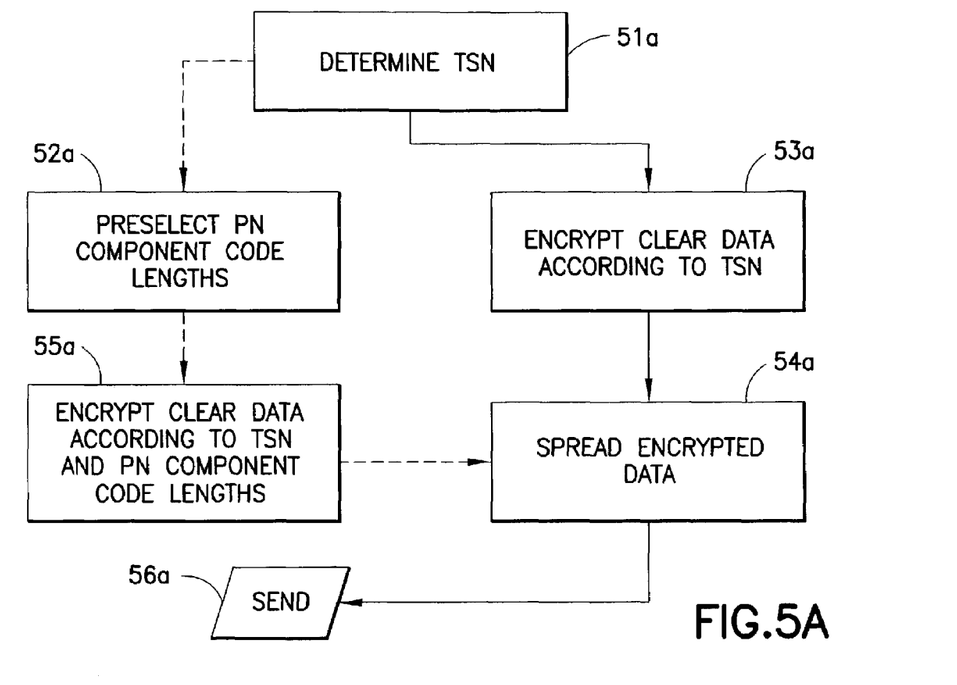
FIGS. 5A and 5B are method flow charts implementing features of the present invention shown in FIGS. 1, 2A, and 2B.

Referring to FIG. 5A there is shown a method flow chart implementing features of the present invention shown in FIGS. 1 and 2A (described in detail below). Referring to FIG. 5A, in a TDMA-SS system step 51*a* determines a Time Slot Number (TSN) corresponding to the transmitter's assigned time slot and relative to a minor epoch of the transmitter's local composite PNc code. Step 53*a* encrypts clear data according to the TSN and step 54*a* spreads the data according to the composite PNc spreading code. Step 56*a* sends or transmits the PNc encoded and encrypted data.

It should be noted that very time slot in a PN code from XYZ to XYZ epoch (assuming a three component PN code) is numbered. For example, if there are 7E6 time slots from XYZ to XYZ epoch, the time slots are numbered from 1 to 7E6, consecutively. In this invention testing is performed at minor epochs, such as at XY epochs, and time slot numbers do not repeat from 1–56 per XY epoch.

Still referring to FIG. 5A it can be seen that optional steps 52*a* and 55*a* correspond to a quasi-public key encryption method. Step 52*a* pre-selects two of the relatively prime PN component codes and step 55*a* encrypts clear data according to the two prime PN component codes and the TSN. It will be appreciated that in alternate embodiments the composite PNc code can have any suitable number of relatively prime PN component codes.

Figure 5B:
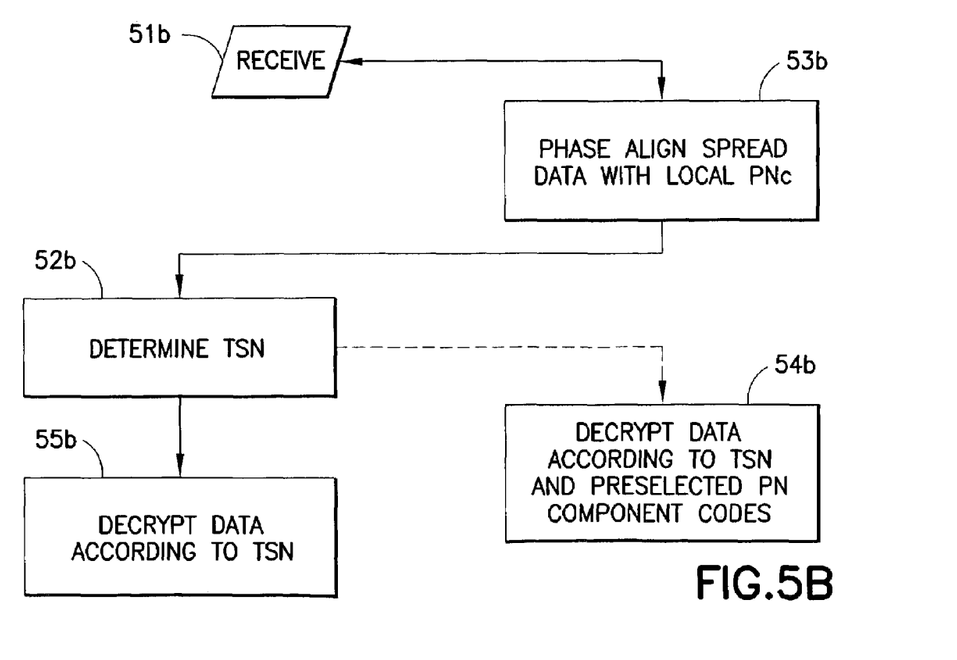

Referring to FIG. 5B, there is shown a method flow chart implementing features of the present invention shown in FIGS. 1 and 2B (described in detail below). Step 51*b* receives the PNc spread and encrypted data and step 53*b* phase aligns, either partially and/or fully, the received data with the receiver's locally generated composite PNc code. Step 52*b* determines the encrypted data's TSN relative to the minor epoch of the composite PNc code and step 55*b* decrypts the encrypted data according to the determined TSN.

Still referring to FIG. 5B, step 54*b* shows an alternate embodiment corresponding to the quasi-public key method described above; step 54*b* decrypts the data according to the TSN and the pre-selected PN component codes.

In this invention the transmitter TSN translator is adapted to translate the TSN to an integer variable e, where integer variable e is relatively prime to the product of (X−1)(Y−1), wherein X and Y are code lengths of the at least two of the relatively prime transmitter PN component codes, respectively; and where the encryptor is adapted to encrypt the clear data according to $EC = (\text{clear data})^e (\text{mod}(X*Y))$, where EC is encrypted data. The transmitter TSN translator can include a TSN-to-e look-up-table or a TSN-to-e algorithm.

Figure 1:
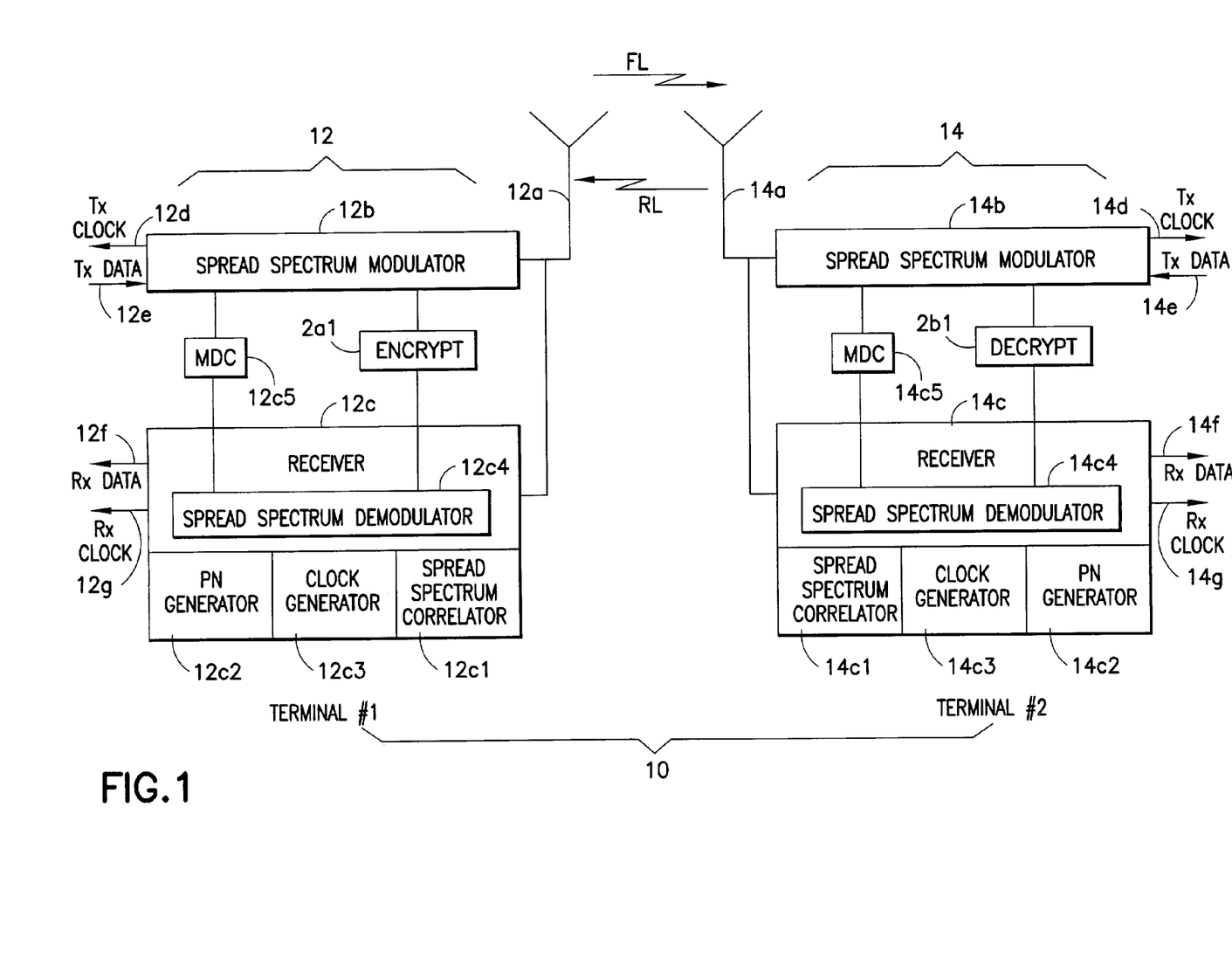
FIG. 1 is a pictorial diagram of a communication system having a fast encryption spread spectrum transmitter and a fast decryption spread spectrum receiver incorporating features of the present invention.

Referring to FIG. 1, there is shown a pictorial diagram of a telecommunications system incorporating features of the present invention. Although the present invention will be described with reference to the embodiments shown in the drawings, it should be understood that the present invention might be embodied in many alternate forms of embodiments, e.g., point-to-point simplex links, point-to-multipoint links, and either simplex or full-duplex links. In addition, it should be understood that the teachings herein may apply to any group or assembly of spread spectrum (SS) or time domain—spread spectrum (TD-SS) receivers, including those that are fixed in place; vehicle mounted; and/or hand carried.

Still referring to FIG. 1, there is shown a full-duplex system 10 that is suitable for practicing this invention. Specifically, the system 10 employs direct sequence spread spectrum based techniques over an air link to provide data transfer between Terminal #1 12 and Terminal #2 14. The forward link (FL) from Terminal #1 12 to Terminal #2 14 contains a spread spectrum waveform that is constructed in the manner described herein, with the PN code being composed of relatively prime length codes. In a similar manner, the return link (RL) from Terminal #2 14 to Terminal #1 12 contains a spread spectrum waveform that is similar or identical to that of the FL.

Terminal #1 12 includes a Spread Spectrum Modulator (SSM) 12*b*; the SSM 12*b* generates a desired spread spectrum waveform at a desired RF frequency. The SSM 12*b* also provides a Tx clock 12*d* that is used to clock the Tx Data 12*e* into the SSM 12*b*. The SSM 12*b* then combines the Tx data 12*e* with a spread spectrum PN code to produce the desired spread spectrum waveform. Terminal #1 12 also includes an antenna 12*a*, which may transmit at any suitable RF frequency. Terminal #1 12 also includes a modulator/demodulator controller (MDC) 12*c*5 and module 2*a*1 for encrypting clear data in accordance with the teachings of the present invention.

The signal generated by Terminal #1 12 and transmitted by antenna 12*a* via the FL is received by Terminal #2 14 via antenna 14*a* to receiver 14*c*. Receiver 14*c* includes a spread spectrum correlator 14*c*1, PN generator 14*c*2, clock generator 14*c*3, and spread spectrum demodulator (SSD) 14*c*4. The received signal is then demodulated by SSD 14*c*4. Once the signal is acquired and the receiver 14*c* is tracking the received signal, the Rx Clock 14*g* and Rx Data 14*f* are output to the intended user. It will be appreciated that the data clocks 14*g* and 12*d* are synchronous and may be commanded to change frequency on the PN epochs; thus advantageously providing means to vary the data rate without interruption; and without the need for bit synchronizers to acquire and track at the new clock frequency with their associated loss of clock coherence between the transmitter and receiver.

Similarly, Terminal #2 14 generates a Tx Clock 14*d* and Tx Data 14*e* using the Spread Spectrum Modulator 14*b* in a similar fashion described earlier for Terminal #1. Likewise, Terminal #1 12 may receive the RL signal via antenna 12*a*, and demodulate and track the signal as described earlier with receiver 12*c* to provide Rx Data 12*f* and Rx Clock 12*g* to the intended user. Terminal #2 14 also includes a modulator/demodulator controller (MDC) 14*c*5 and module 2*b*1 for decrypting encrypted data in accordance with the teachings of the present invention.

In a preferred embodiment of this invention a composite PN code PNc contains PN component codes, each component code being relatively prime with respect to the other component codes. In other words, each of the PN component codes does not share any prime multiplicands with either of its companion PN component codes. For purposes of example only, consider three component codes of one digit each: X, Y, and Z; where Length (L) $L_x$=5 chips, $L_y$=7 chips, and $L_z$=9 chips. It can be seen that the numbers 5 and 7 are prime numbers, and the number 9 is derived from the prime number 3, meaning that the numbers 9, 5 or 7 do not share any prime multiplicands. It will be appreciated that in alternate embodiments the PN component codes can be any suitable number of digits.

The epoch of a PN component code occurs once per the length of the component code, and the epoch is customarily recognized as the all-ones state of the PN component code generator. In accordance with features of the present invention, the major epoch of a composite $PN_C$ code occurs once per the length of the composite code ($L_x \times L_y \times L_z = L_{xyz}$) and is recognized as the simultaneous occurrence of the all-ones state of each component code.

The composite PN code includes three or more relatively prime component codes of lengths: X, Y, Z (in this non-limiting example). In the preferred embodiment, an integer number of time slots are chosen for an XY epoch: in units of Time-Slots/($L_x L_y$ chips). Each time slot is assigned a unique, Time Slot Number (TSN) from the beginning of the component code (the XYZ epoch). Time Slot Numbers may be consecutive counting numbers, beginning with 1 and ending with n, or may use any suitable method for uniquely identifying the Time Slot. It will also be appreciated that the invention presented herein may be used with any suitable PN composite encoded system. For example, a particular PN composite code phase position, or consecutive PN composite code phase positions, may be used to uniquely identify a particular phase segment of the PN composite code.

Figure 2A:
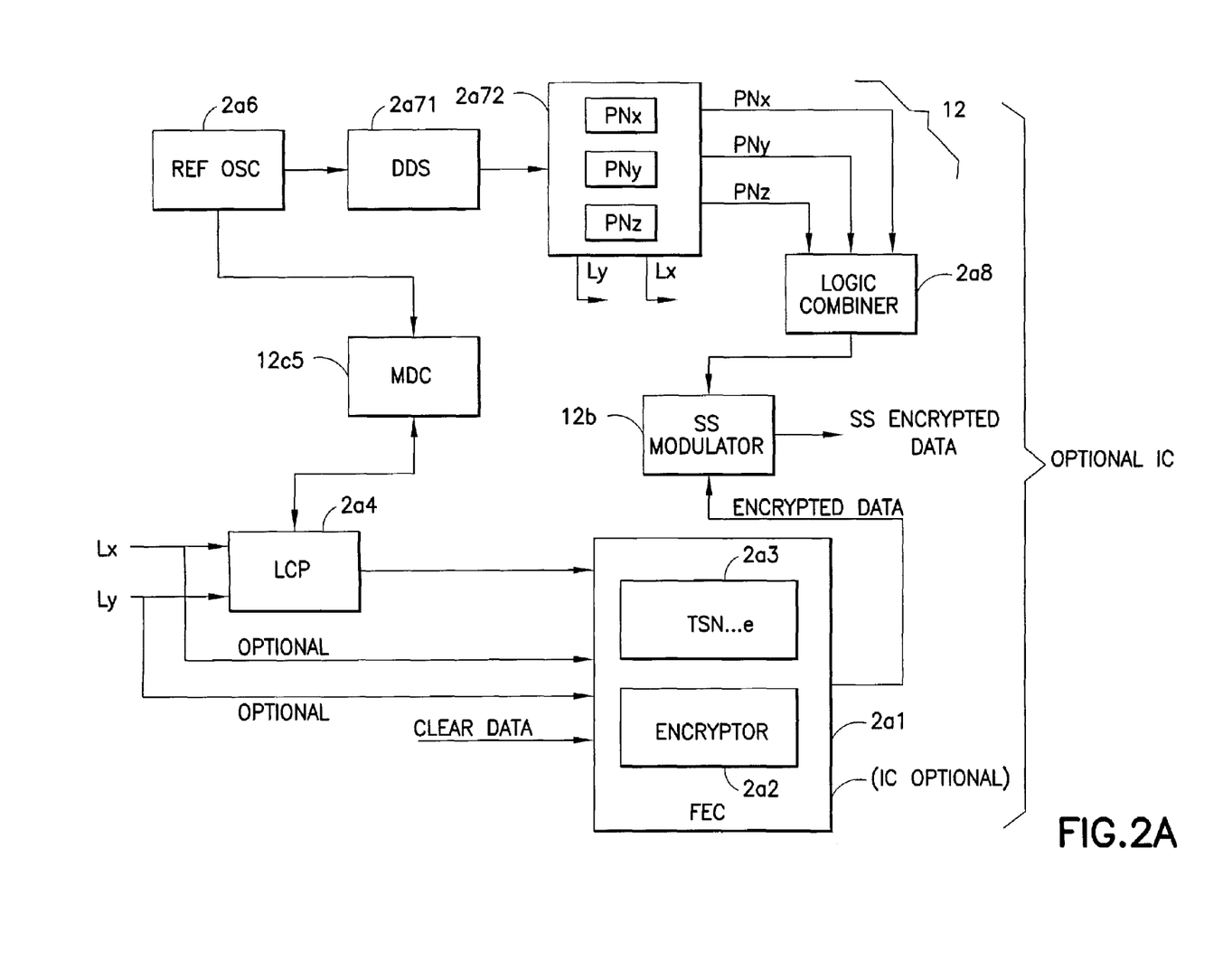
FIG. 2A is a detailed block diagram of the fast encryption spread spectrum transmitter shown in FIG. 1.

Referring to FIG. 2a there is shown an encryption system incorporating features of the present invention shown in FIG. 1. Discrete Digital Synthesizer (DDS) 2a71, driven by reference oscillator 2a6, drives PN code generator 2a72 to generate component PN codes PNx, PNy, and PNz. In alternate embodiments, any suitable number of component codes may be used. Logic combiner 2a8 combines the component codes to form the composite PNc code used by modulator 12b for spreading data. In embodiments where four PN component codes are used, the component codes may be MAND combined according to:

$$(X \oplus (Y \cdot (Z_1 \oplus Z_2))),$$

or MAJ combined according to:

$$(X \cdot Y) \oplus (X \cdot Z_1) \oplus (X \cdot Z_2) \oplus (Y \cdot Z_1) \oplus (Y \cdot Z_2) \oplus (Z_1 \cdot Z_2)$$

The modulator/demodulator controller (MDC) 12c5 manages PN code modulation and demodulation, measures time since initialization (TSI) of the PN codes by counting cycles of the reference oscillator 2a6 from which the PN chipping rates are mathematically derived by DDS (direct digital synthesizer) 2a71, and tracks PN code phase by counting the actual number of chips produced, and by recording intentional PN code slips and advances (delta phase).

The LCP 2a4 requests and receives timely TSI and PN code delta phase information from the MDC 12c5. The LCP 2a4 uses MDC status to statically correct its internal clock count to reflect the MDC's TSI, converted to units of LCP time, since, in practice, the LCP clock (not shown) is inferior to the MDC's internal oscillator. Aided by this MDC status, the LCP's clock keeps track of composite PN code phase in units of time since the beginning of the code (TOC, time of code). Continuously tracking TOC, the LCP 2a4 calculates the TOC for the next-occurring XY epoch and the time slot number (TSN) of the time slot that begins at the XY epoch. The LCP 2a4 is programmed to interrupt its processes at the TOC of the next occurring XY epoch minus a programmable amount of lead-time that allows time in which the LCP can communicate with the FEC Module 2a1 prior to the actual occurrence of the XY epoch. At the interrupt, the LCP 2a4 communicates to the FEC Module 2a1 the TSN of the time slot that begins at the next XY epoch.

The FEC Module 2a1 receives a symbol clock and an XY epoch clock from the MDC 12c5 and determines time slot boundaries by counting symbol clocks. At the LCP interrupt, it receives notification of the TSN of the time slot that begins at the next XY epoch, and generates the appropriate time slot number (TSN) for the time slot that begins with the next XY epoch, and continues to generate the appropriate TSN for each consecutive time slot.

In a quasi-public key embodiment the unique TSN may be used to equate the public key variable e (described above) to a predetermined, large random integer, relatively prime to the product of $(X-1)*(Y-1)$ (where X and Y are the prime numbers representing PNx and PNy code lengths, respectively). It will be appreciated that any suitable method for equating the TSN to e may be used. For example, and as was noted above, the unique time slot identifier may be used as a pointer to a look-up-table of "e" values, or similar to the master key embodiment, as a seed value to a predetermined algorithm for generating "e" values. It will be appreciated that this embodiment has advantages of a public key system but is less susceptible to decryption by factoring the variable n. Indeed, the present invention advantageously allows the sender to dynamically encrypt time slot(s), where each time slot has a typical duration of milliseconds, with a different encryption key. For example, a one second stream of data from a user may be encrypted with one thousand different encryption keys; making interception and decryption by non-intended recipients extremely difficult.

Once the receiver 14 receives the broadcast signal from the transmitter 12, the receiver 14 uses PN code phase information received from the transmitter, and its own PN code phase information to slip or advance its transmit PN code phase to match the PN code phase of the transmitter. Since the receiver 14 initializes its PN code at any time before or after the transmitter initializes its PN code, the resulting PN phase difference between the transmitter and receiver is potentially large. Also, the corresponding receiver 14 LCP-generated TSN will not agree with the transmitter's 12 TSN until the PN code phase of the transmitter 12 is matched to the PN code phase of the receiver 14.

In terms of quantities measured by the MDC 14c5 or 12c5, composite PN code phase is given as follows:

$$\theta_{PN} = TSI_{\rightarrow Chips} + \Delta\theta_{PN} = TSI_{\rightarrow Chips} + \Delta\theta_{XYZ} + \Delta\Sigma\theta \qquad \text{(Eq. 1)}$$

Equation 1 shows that composite PN code phase $\theta_{PN}$, in chips, is equal to TSI of the PN code, converted into chips, plus delta phase $\Delta\theta_{PN}$. If the PN code were free running (i.e., based only on the reference oscillator), the composite PN code phase would exactly equal the TSI, converted into chips; in a free-running system, an exact ratio exists of chips per TSI LSBs (least significant bits). For example, if TSI is a count of 10 MHz reference oscillator cycles, and chips are counted in finer increments of the master clock called sampling clocks. Therefore, there are $n_1$ sampling clocks per chip (SCPC): 1, 2, 4, or an integer number.

At the beginning of each time slot, a receiving demodulator 12c4 searches through a given PN code uncertainty to correlate its PN code phase with the PN code phase of the transmitting platform 14 assigned to the time slot. In addition, the receiver 12 accumulates PN code phase while it is demodulating a signal from the transmitting platform 14 having a clock 14c3 whose rate is not exactly equal to the receiver's reference clock 12c3. A receiver's demodulator 12c4 also accumulates some additional PN code phase difference because the signal from the transmitting platform 14 may not have compensated at all, or compensated imperfectly, for the Doppler effect.

As indicated in Equation 1, delta phase also includes intentional PN code slips or advances, $\Delta\theta_{xyz}$.

If more or less chips are modulated or demodulated per unit of time than would have been had they been modulated or demodulated at the free-running rate of the respective reference oscillator, these chips are considered as accumulated delta phase or accumulated in an amount greater than or less than the free-running amount. Accumulated delta phase is calculated by the MDC 14c5 and 12c5, using Equation 2.

$$\#SCLK_{\rightarrow Chips} = TSI_{\rightarrow Chips\ via\ exact\ conversion} + \Delta\Sigma\theta \quad (Eq.\ 2)$$

MDC 14c5 and 12c5 latch their count of sampling clocks and TSI at the same instant that the TSI LSB increments. There is an exact relationship between TSI and the number of sampling clocks that should have occurred during the latched TSI. The difference between the number of chips that ideally occurs during the latched TSI and the actual number of sampling clocks counted, converted into chips, is equal to accumulated delta phase, $\Delta\Sigma\theta$. For purposes of this invention description, the symbol $\Delta$ (delta) is used to indicate delta or difference, $\Sigma$ (sigma) is used to indicate addition or accumulation, and $\theta$ (theta) is used to indicate phase.

The following numerical example is for purposes of illustration only and is not intended to limit the scope of the invention. The LCP 2b4 (see FIG. 2B) measures time in 0.4096 ms LSBs, and composite PN code phase, $\theta_{PN}$, is then measured, for time slot counting purposes, in units of 0.4096 ms LSBs. In other words, delta phase is expressed in terms of 0.4096 ms LSBs, and an exact conversion between sampling clocks and 0.4096 ms LSBs (referred to hereafter as TOC_LSBs) is derived.

Sampling Clock to TOC_LSB Conversion Factor:

A more exact conversion between delta phase, in terms of sampling clocks, and TOC_LSBs, is given in Equation 3. The LCP 2b4 obtains (from the MDC 14c5) the status of delta phase in units of sampling clocks (not shown) and the numerical value of sample rate (samp_rate), and uses Equation 3 to convert delta phase into units of TOC_LSBs.

$$\Delta\theta_{PN}(TOC\_LSBs) = \Delta\theta_{PN}(Sampling\ Clocks) \times \frac{2^{15}}{Sample\ Rate \times 3} \quad (Eq.\ 3)$$

Sample Rate is the seed word used by the DDS 2b71, in units of DDS LSBs, to mathematically generate a master clock rate from the 10 MHz reference oscillator. The multiply-and-divide ratio of the DDS 2b71 used by the HRDD 14c4 is reflected in Equations 3 and 4. The numerical value of the of Sample Rate for the present example is calculated, using Equation 4, given the referenced DDS 2b71.

$$Sample\ Rate(Master\ Clock\ Rate, sampling\ clocks\ per\ second) \quad (Eq.\ 4)$$

$$= Chipping\ Rate \times \frac{2^{20}}{3 \times 5^7} \times SCPC$$

In general, Delta phase is a slowly changing quantity. For example, at 550 Knots each, the Doppler effect between two moving platforms changes slowly in terms of TOC_LSBs accumulated per XY epoch. It will be appreciated that intentional slips and advances of hundreds or thousands of chips used during the acquisition of a TDMA time slot are also small compared to TOC_LSBs.

The broadcast receiver LCP 2b4 uses delta phase status from its MDC 14c5 in order to calculate the PN code slip or advance needed to align the receiver's PN composite code phase with the transmitter's free-running PN composite code phase. In general, the receiver's MDC 14c5 reports that it has achieved its Track State when the Broadcast Link is acquired. The Track State is achieved almost immediately upon accomplishing PN Detect and can be reported immediately, but Delta Phase information takes some time to gather, and the Delta Phase information reported along with the first indication of Track State may not actually represent the delta phase associated with the Track State. Therefore, in order to avoid ambiguity, the LCP 2b4 waits for the MDC 14c5 status packet that follows the first report of Track State and uses the Delta Phase status from this packet for its calculation. Similarly, the LCP 2b4 preferably verifies that its MDC 14c5 has slipped or advanced its TDMA-link delta phase by the LCP-commanded amount, which places the received PN code phase in the center of the receiver's demodulator PN code phase uncertainty, before the LCP 2b4 uses the MDC's delta phase in LCP Time Slot Numbering equations.

Figure 3:
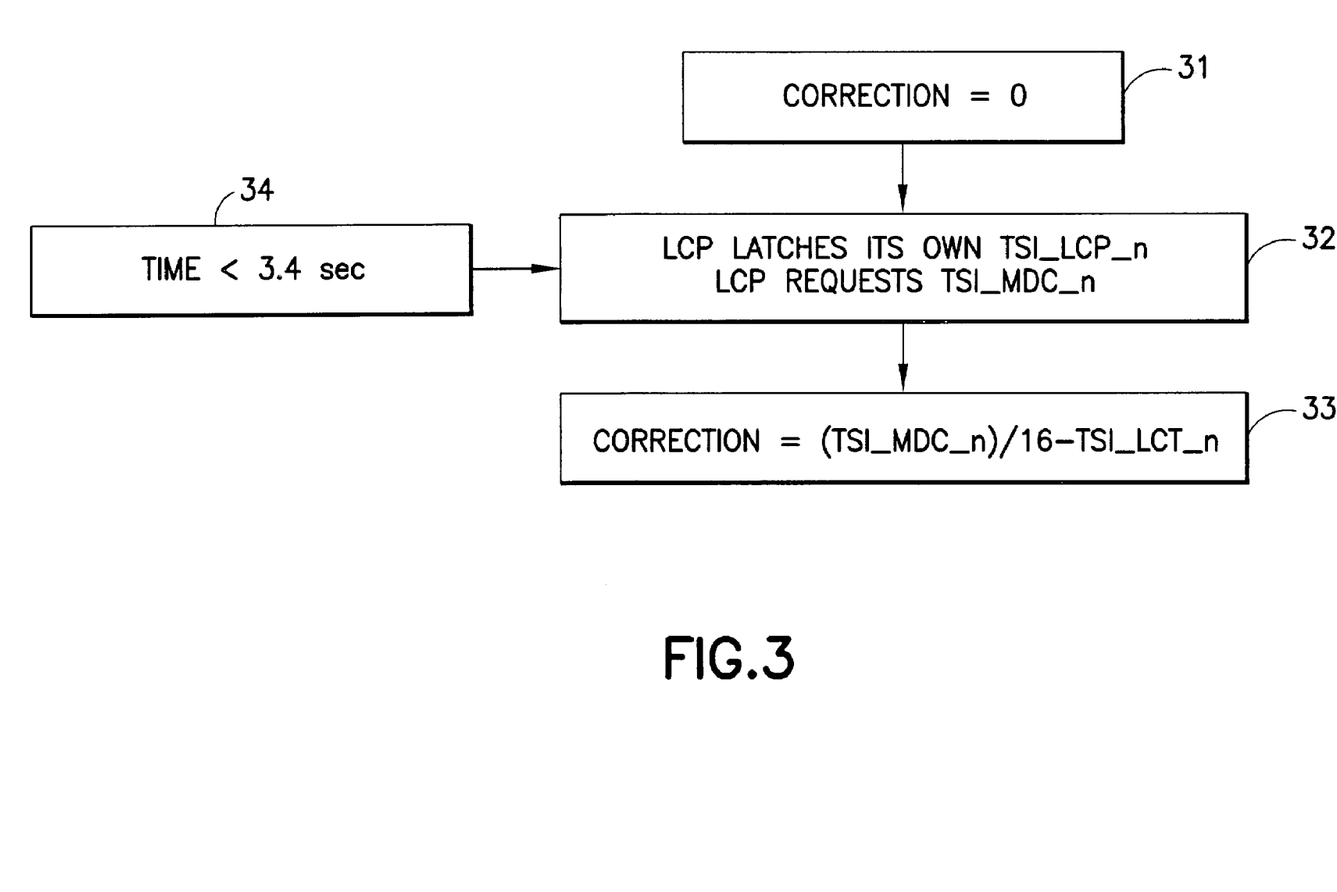
FIG. 3 is a flow chart implementing time-since-initialization correction features of the present invention shown in FIG. 2b.

Correcting TSI_LCP to TSI_MDC:

Referring to FIG. 3, there is shown a block diagram illustrating one method by which the LCP 2b4 updates its TOC correction term. Using Equation 3 the LCP 2b4 calculates the delta phase portion of composite PN code phase, the latter part of Equation 1, but in order for the LCP 2b4 to complete the calculation of TOC, the LCP 2b4 receives the MDC's TSI (in the above example, LSB=25.6 microseconds, which divided by 16 becomes compatible with 0.4096 ms units), step 32, and the LCP develops a correction factor, step 33, to correct its own TSI to agree with the MDC's TSI. Step 34's 3.4 seconds represents any appropriate integration time—the time in which the LCP clock drifts away from the MDC clock by an LSB, or some suitable unit of time. The TOC is then determined by:

$$TOC(0.4096\ ms\ LSBs) = TSI\_LCP\_instantaneous + \quad (Eq.\ 5)$$

$$Correction + \Delta\theta_{PN} \times \frac{2^{15}}{Sample\ Rate \times 3}$$

It can be seen that Equation 3 has been incorporated into Equation 5 as the last term. The LCP 2b4 latches its free-running, instantaneous TSI_LCP and uses Equation 5 to calculate TOC, which is the composite PN code phase expressed in 0.4096 ms LSBs.

With regard now to calculating an LCP interrupt, it should be remembered that time slot numbering is being done at the transmitter (encryptor) and at the receiver (decryptor). The LCP interrupt is by what the LCP 2b4 communicates the TSN to the FEC Modules 2a1 and 2b1, respectively. In order to calculate an LCP interrupt, a conversion factor is used to convert between TOC_LSBs and XY epochs. The conversion factor is provided in Equation 6:

$$TOC\_LBS\ to\ XY\ Epoch\ Conversion\ Factor = \quad (Eq.\ 6)$$

$$\frac{2^{15} \cdot L_X \cdot L_Y \cdot SCPC}{Sample\ Rate \cdot 3} \frac{TOC\_LSBs}{XY Epoch}$$

It can be seen that Equation 6 incorporates Equation 3's sampling clock to TOC_LSB exact conversion factor times the number of sampling clocks per XY epoch, which is the length of the X code in chips, $L_X$, times the length of the Y code in chips, $L_Y$, times SCPC, sampling clocks per chip. The number of the next-occurring XY epoch is given in Equation 7.

$$\text{Next } XY \text{ Epoch} = XYE = IP\left[TOC \times \frac{\text{Samlpe Rate} \times 3}{SCPC \cdot 2^{15} \cdot L_X \cdot L_Y}\right] + 1 \quad \text{(Eq. 7)}$$

Equation 7 is an intermediate equation that leads to the calculation of the interrupt. It can be seen in Equation 7 that the LCP's 2b4 and 2a4 instantaneous TOC times the XY epoch per TOC_LSB conversion factor of Equation 6 is the current composite PN code phase in terms of an integer plus fractional number of XY epochs. The integer portion is the number of the last XY epoch that occurred, and adding 1 to that number is the number of the next XY epoch to occur.

The number of the next XY epoch to occur is used to calculate the number of the time slot that immediately precedes the next-occurring XY epoch, as shown in Equation 8.

Time Slot Number of Slot That Begins at the Next
XY Epoch=TSN_XY=XYE×TSPXYE+1 (Eq. 8)

Interrupt time is calculated as shown in Equation 9.

Interrupt Time (TOC_LSBs) = (Eq. 9)

$$XYE \times \frac{SCPC \cdot 2^{15} \cdot L_X \cdot L_Y}{\text{Sample Rate} \times 3} - \text{Lead Time} (0.4096 \text{ ms } LSBs) + 11$$

In a preferred embodiment, the LCP 2b1/2a1 checks its instantaneous TOC approximately once per millisecond to determine if TOC is equal to or greater than the interrupt time. If it is, the interrupt is serviced. The lead-time term of Equation 9 is the amount of time that the interrupt should preferably occur prior to the XY epoch.

Figure 4:
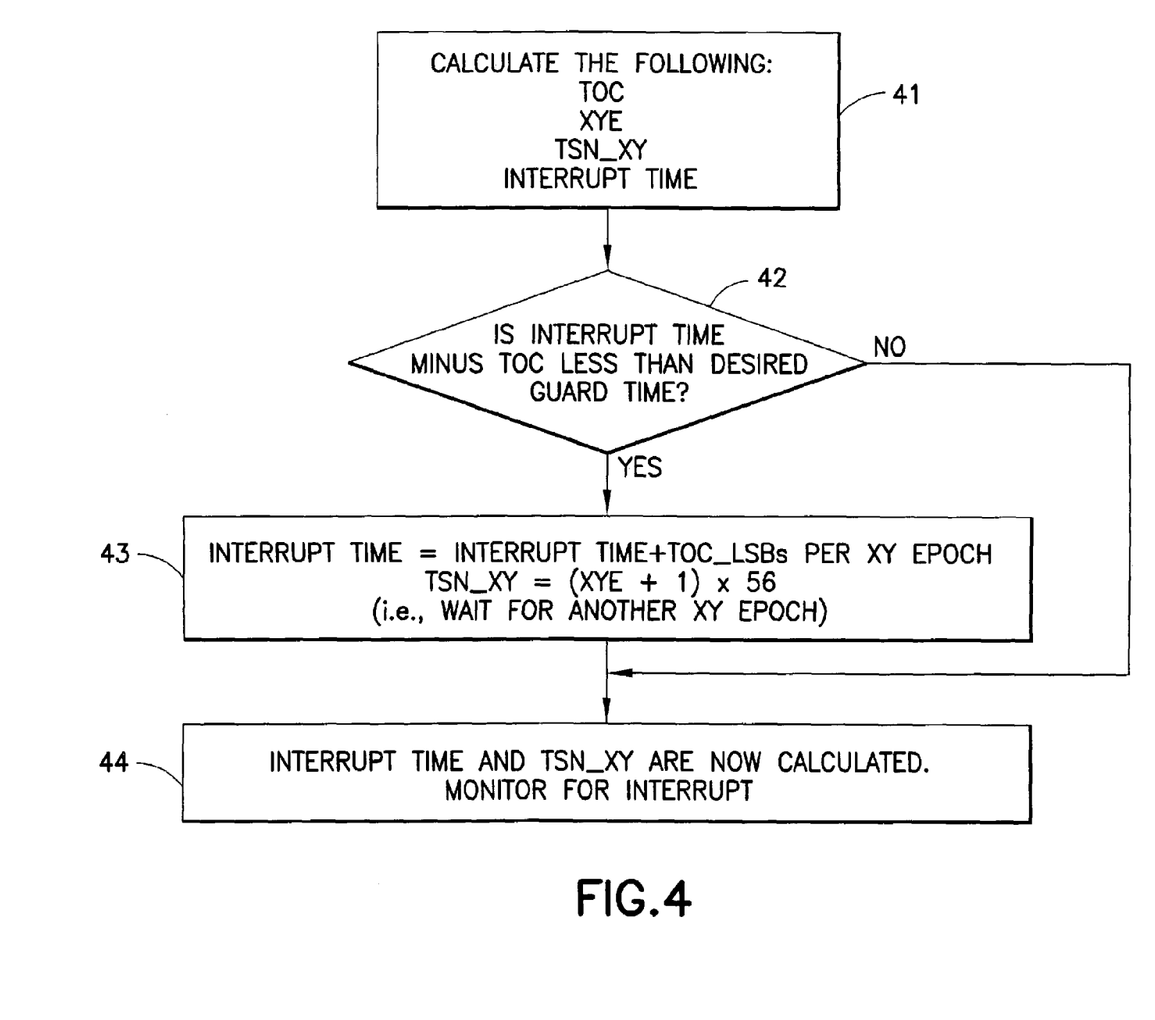
FIG. 4 is a flow chart implementing guard time features of the present invention shown in FIG. 2b.

It will be appreciated that TOC and interrupt uncertainties may be accounted for by adding TOC_LSBs to the interrupt time of Equation 9, see FIG. 4. Step 41 determines the interrupt time to be tested by step 42 to determine if sufficient time is available for the interrupt activities to be completed. The interrupt activity of concern, principally, is for the encryptor or decryptor to receive the LCP's TSN and make corrections as necessary. If there is not sufficient time then LCP 2b4/2a4 adds, step 43, an XY number of TOC_LSBs to its interrupt time (TOC_LSBs per XY Epoch=Equation 6), which has the effect of waiting for another XY epoch to perform the interrupt. In a preferred embodiment the LCP 2b4/2a4 leaves sufficient lead time prior to the next XY epoch.

The following example is for purposes of illustration only and is not intended to limit the scope of the invention. LCP 2b4/2a4 is provided an indication of an XY epoch from logic combiner 2b8/2a8. It will be appreciated that in alternate embodiments the XY epoch indication may be provided by any suitable circuitry, such as the MDC 14c5/12c5. It will be further appreciated that indication of the XY epoch may be provided by any suitable means such as a discrete, hard-wired, logic signal, a register, or a memory device.

Figure 2B:
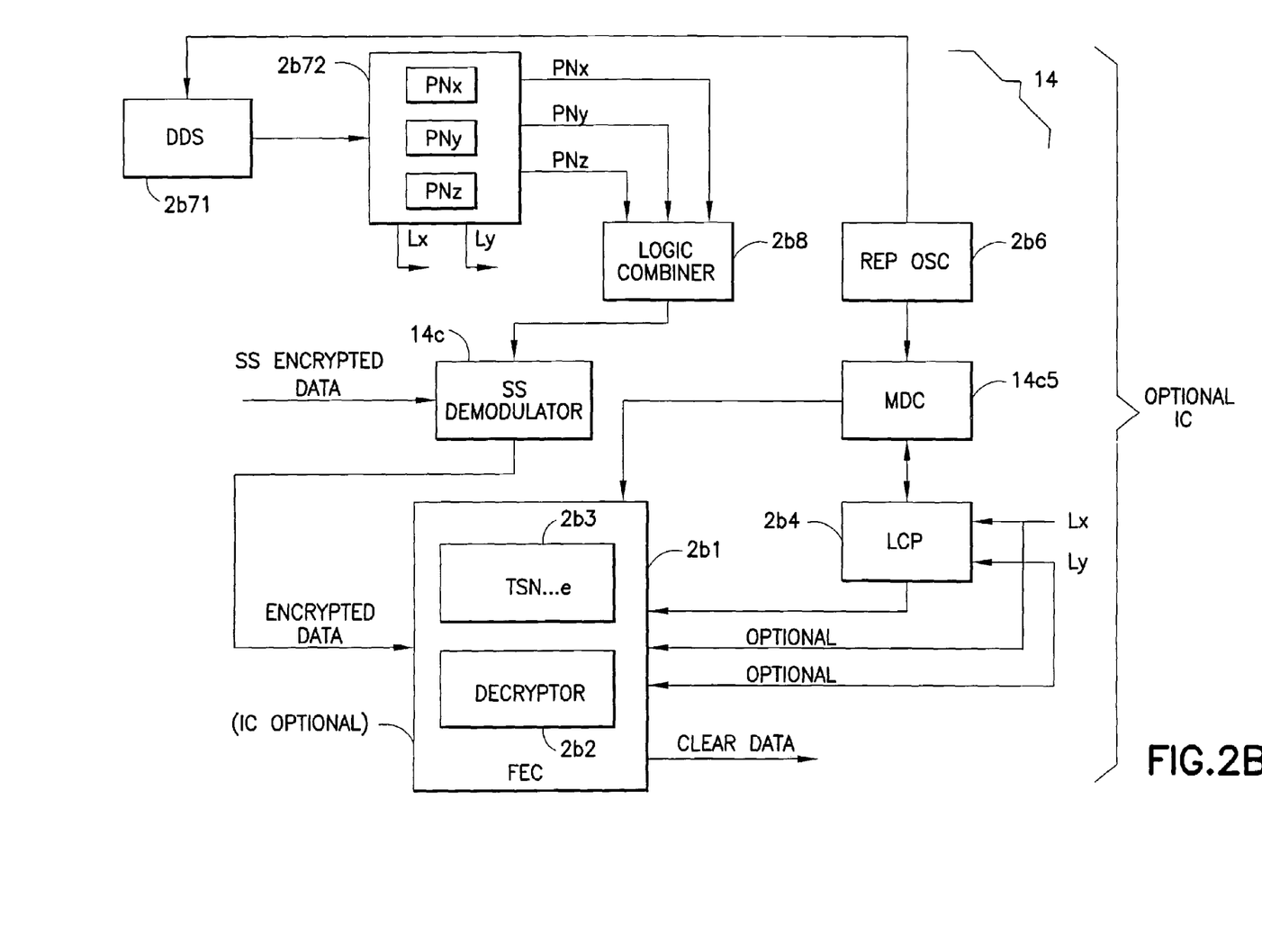
FIG. 2B is a detailed block diagram of the fast encryption spread spectrum receiver shown in FIG. 1.
Figure 6:
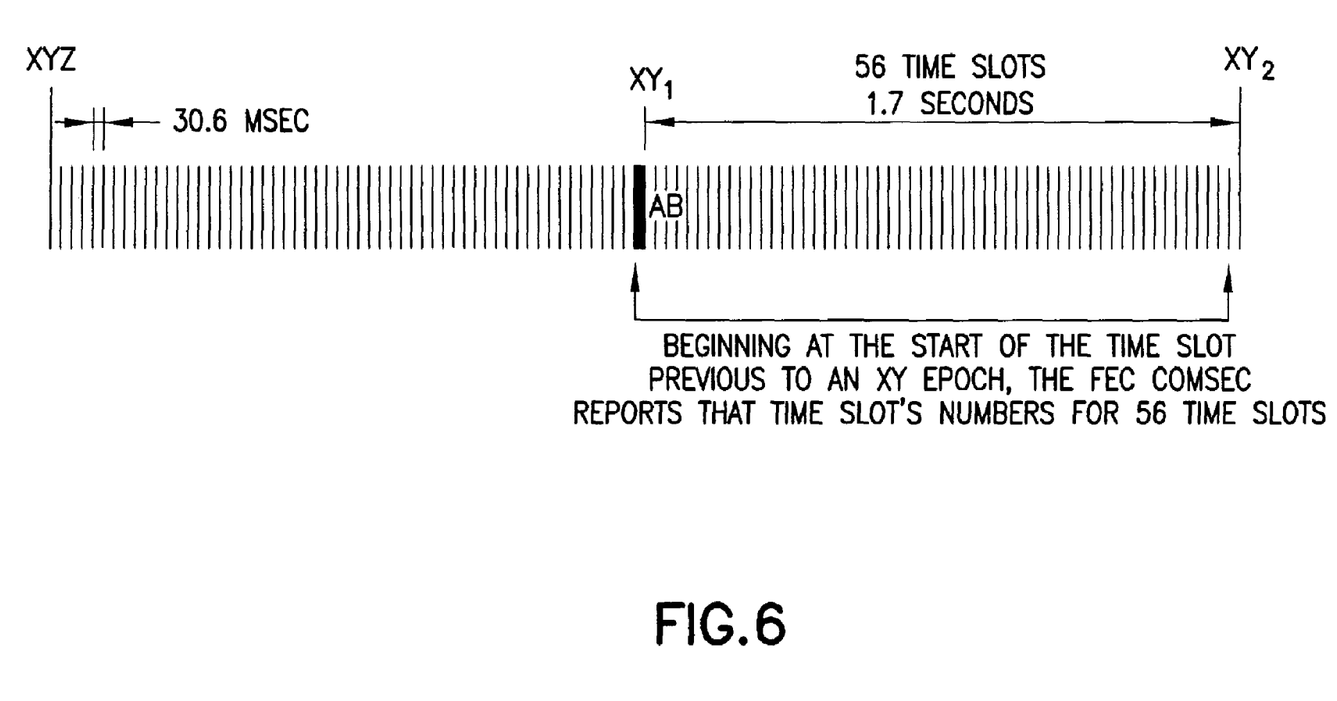
FIG. 6 is a pictorial diagram of an example time slot structure incorporating features of the present invention shown in FIGS. 1, 2A, and 2B.

Referring to FIG. 6 there is shown a pictorial timing diagram of an example illustrating features of the present invention shown in FIGS. 1, 2A, & 2B. In this example the FEC 2b1/2a1 reports the TSN of the time slot immediately previous to an XY epoch, and that epoch number is reported for fifty-six time slots, as shown. The first time slot following an XY epoch is identified as Time Slot A, and the second time slot following the XY epoch is identified as Time Slot B. Further the LCP is informed of the XY epoch at the time of the XY epoch's occurrence. Stated differently, the LCP (2a4, 2b4) acknowledges the XY epoch and performs Time Slot Numbering during Time Slot A.

The TSN during time slot A is given by the following:

TSN reported=56*IP((TOC+5)*(Sample_Rate*3)/
(SCPC*2*Lx*Ly) (Eq. 10).

During Time Slot A, if the reported TSN does not agrees with an LCP's result of Eq. 10, then the LCP adds two to the result of Eq. 10, supplies the now modified result to FEC and sets a status flag (not shown) alerting the FEC that the modified result is the TSN to be applied as TSN of Time Slot B.

In Eq. 10, 5 LSBs of 0.4096 msec are added to TOC in order to account for the case of zero latency in the Correction term and in order to account for TSI sampling granularity and uncertainty. Adding 5 LSBs, in this example, helps to ensure a TOC reported PN code phase that exceeds the XY epoch by a couple of milliseconds in order for TOC to report the PN code phase equal to or slightly greater than the PN code phase of the XY epoch.

Once the receiver TSN is determined, the TSN may be used to generate a master decryption key by indexing a look-up table, or seeding a master key algorithm, as described above (the same operation is occurring at the transmitter's encryptor as well). It will be appreciated that such a dynamic distribution approach obviates the need for distributing the master key before a particular user may need it.

It will be further appreciated that using PN component code lengths Lx and Ly obviates the time consuming step of the public key method (described above) where p and q values are randomly generated and tested. In alternate embodiments, any two relatively prime PN component code lengths may be used to encrypt and decrypt clear data. For example, a PN composite code having four PN components (e.g., PNx, PNy, $PN_{z_1}$ and $PN_{z_2}$), $PN_{z_1}$ and $PN_{z_2}$ could be used in place of the p and q variables described above.

It is also understood that extended float arithmetic is suitable to accommodate the methods presented above. The equations have been tested using 64 bit binary arithmetic, rounded to 55 mantissa bits and the respective power of ten at each intermediate product. However, it is understood that any suitable arithmetic techniques may be used.

In addition, in alternate embodiments the TSN generator may be a programmable device such as an integrated circuit (IC). It will be further appreciated that the IC may be a field programmable gate array (FPGA), an application specific IC (ASIC), or a function of MDC firmware. The operation of the ICs or firmware may be defined by a suitable programming language such as a Very High Speed Integrated Circuit (VHSIC) Hardware Description (VHDL) Language file. Accordingly, the present invention is intended to embrace all such alternatives, modifications and variances that fall within the scope of the appended claims.

What is claimed is:

1. A system for fast data encryption/decryption, comprising:
   a transmitter system comprising a transmitter logic circuit (TLC), the TLC comprising at least three transmitter pseudo-noise (PN) component code generators $PN_x$, $PN_y$, $PN_z$, where each transmitter PN component code generator generates relatively prime transmitter PN component codes when compared with each of the other transmitter PN component codes; said transmitter system further comprising a first processor coupled to the TLC, where the first processor determines a time slot number (TSN) relative to at least two of the relatively prime transmitter PN component codes; and an encryptor for encrypting clear data in accordance with the TSN; and a receiver system comprising a second processor to determine the TSN; and a decryptor coupled to the second processor to decrypt the encrypted clear data in accordance with the TSN.

2. A system as in claim 1, where the encryptor encrypts the clear data in accordance with the TSN and at least two of the transmitter PN component codes.

3. A system as in claim 2, where the encryptor comprises a transmitter TSN translator coupled to the first processor, where the transmitter TSN translator translates the TSN to an integer variable e, where integer variable e is relatively prime to the product of (X−1)(Y−1), where X and Y are code lengths of the at least two of the relatively prime transmitter PN component codes, respectively; and where the encryptor encrypts the clear data according to EC=(clear data)$^e$(mod (X*Y)), where EC is encrypted data.

4. A system as in claim 3, where the transmitter TSN translator comprises a TSN-to-e look-up-table.

5. A system as in claim 3, where the transmitter TSN translator comprises a TSN-to-e algorithm.

6. A system as in claim 1, where the transmitter further comprises a logic combiner for logically combining the relatively prime transmitter PN component codes to form a composite PN code.

7. A system as in claim 6, where the logic combiner comprises a MAND logic combiner to combine at least four PN component codes according to $(X \oplus (Y \cdot (Z_1 \oplus Z_2)))$.

8. A system as in claim 6, where the logic combiner comprises a MAJ logic combiner to combine at least four PN component codes according to $(X \cdot Y) \oplus (X \cdot Z_1) \oplus (X \cdot Z_2) \oplus (Y \cdot Z_1) \oplus (Y \cdot Z_2) \oplus (Z_1 \cdot Z_2)$.

9. The system as in claim 1, where the receiver further comprises a receiver logic circuit (RLC), the RLC comprising at least three receiver pseudo-noise (PN) component code generators $PN_x$, $PN_y$, $PN_z$, where each receiver PN component code generator locally generates the relatively prime transmitter PN component codes; and the second processor determines the TSN, where the TSN is relative to at least two of the relatively prime receiver PN component codes.

10. A system as in claim 3, where the decryptor comprises a receiver TSN translator to translate the TSN to the integer variable e; the decryptor computes an integer d, according to e*d=1[mod(X−1)(Y−1)], where integer d is the multiplicative inverse of integer e in modulo (X−1)(Y−1); and where the decryptor decrypts the encrypted data according to clear data=EC$^d$(mod (X*Y)).

11. A system as in claim 10, where the receiver TSN translator comprises a TSN-to-e look-up-table.

12. A system as in claim 10, where the receiver TSN translator comprises a TSN-to-e algorithm.

13. A method for fast data decryption, comprising:
determining a time slot number (TSN); and
decrypting encrypted data associated with the TSN in accordance with the TSN;

where determining the TSN comprises:
determining a receiver PN composite code minor epoch, where the receiver PN composite code minor epoch comprises at least two receiver PN component code epochs; and
determining a receiver TSN relative to determining the receiver PN composite code minor epoch.

14. A method as in claim 13, where determining the receiver PN composite code minor epoch further comprises determining the receiver PN composite code minor epoch with sufficient lead time to identify the TSN associated with the encrypted data to be decrypted.

15. A method as in claim 13, where decrypting the encrypted data in accordance with the TSN further comprises
translating the TSN to an integer variable e, where integer variable e is relatively prime to the product of (X−1)(Y−1), where X and Y are code lengths of at least two receiver PN component codes, respectively, computing the integer d, according to e*d=1[mod(X−1)(Y−1)], where integer d is the multiplicative inverse of integer e in modulo (X−1)(Y−1); and decrypting the encrypted data according to: clear data=(encrypted data)$^d$(mod (X*Y)).

16. A method for fast data encryption comprising:
determining a time slot number (TSN); and
encrypting data associated with the TSN in accordance with the TSN;
where determining the TSN comprises:
determining a transmitter PN composite code minor epoch, where the transmitter PN composite code minor epoch comprises at least two transmitter PN component code epochs; and
determining a transmitter TSN relative to determining the transmitter PN composite code minor epoch.

17. A method for fast data encryption, comprising:
determining a time slot number (TSN); and
encrypting data associated with the TSN in accordance with the TSN;
where encrypting the clear data in accordance with the TSN further comprises:
translating the TSN to an integer variable e, where integer variable e is relatively prime to the product of (X−1)(Y−1), where X and Y are code lengths of at least two transmitter PN component codes, respectively; and encrypting the clear data according to: encrypted data= (clear data)$^e$(mod (X*Y)).

18. A communications apparatus comprising:
a transmitter logic circuit (TLC) comprising at least three transmitter pseudo-noise (PN) component code generators $PN_x$, $PN_y$, $PN_z$, where each transmitter PN component code generator generates relatively prime transmitter PN component codes when compared with each of the other transmitter PN component codes;
a first processor coupled to the TLC, where the first processor determines a time slot number (TSN) relative to at least two of the relatively prime transmitter PN component codes; and
an encryptor for encrypting data in accordance with the determined TSN.

19. An apparatus as in claim 18, where the encryptor encrypts the data in accordance with the TSN and at least two of the transmitter PN component codes.

20. An apparatus as in claim 19, where the encryptor comprises:
a transmitter TSN translator coupled to the first processor to translate the TSN to an integer variable e, where integer variable e is relatively prime to the product of $(X-1)(Y-1)$, where X and Y are code lengths of the at least two of the relatively prime transmitter PN component codes, respectively; and where the encryptor encrypts the clear data according to $EC=(\text{clear data})^e \pmod{X*Y}$, where EC=encrypted data.

21. An apparatus as in claim 20, where the transmitter TSN translator comprises a TSN-to-e look-up-table.

22. An apparatus as in claim 20, where the transmitter TSN translator comprises a TSN-to-e algorithm.

23. An apparatus as in claim 18, where the apparatus further comprises a logic combiner for logically combining the relatively prime transmitter PN component codes to form a composite PN code.

24. An apparatus as in claim 23, where the logic combiner comprises a MAND logic combiner to combine at least four PN component codes according to $(X \oplus (Y \cdot (Z_1 \ominus Z_2)))$.

25. An apparatus as in claim 23, where the logic combiner comprises a MAJ logic combiner to combine at least four PN component codes according to $(X \cdot Y) \oplus (X \cdot Z_1) \oplus (X \cdot Z_2) \oplus (Y \cdot Z_1) \oplus (Y \cdot Z_2) \oplus (Z_1 \cdot Z_2)$.

26. An apparatus as in claim 18, where the apparatus is constructed as at least one Integrated Circuit (IC).

27. A communications apparatus comprising a first processor to determine a time slot number (TSN);
a decryptor coupled to the first processor to decrypt encrypted data in accordance with the TSN; and
a receiver logic circuit (RLC) comprising at least three receiver pseudo-noise (PN) component code generators $PN_x$, $PN_y$, $PN_z$, where each PN component code generator locally generates relatively prime PN component codes;
and where the TSN is relative to at least two of the relatively prime PN component codes.

28. A communications apparatus comprising a first processor to determine a time slot number (TSN); and
a decryptor coupled to the first processor to decrypt encrypted data in accordance with the TSN,
where the decryptor comprises a TSN translator to translate the TSN to an integer variable e;
where the decryptor computes an integer d, according to $e*d=1[\bmod(X-1)(Y-1)]$, where d is the multiplicative inverse of integer e in modulo $(X-1)(Y-1)$; and where the decryptor decrypts the encrypted data according to: clear data=$(\text{encrypted data})^d \pmod{X*Y}$.

29. An apparatus as in claim 28, where the TSN translator comprises one of a TSN-to-e look-up-table and a TSN-to-e algorithm.

30. An apparatus as in claim 27, further comprising a logic combiner for logically combining the relatively prime PN component codes to form a composite PN code.

31. An apparatus as in claim 30, where the logic combiner comprises a MAND logic combiner to combine at least four PN component codes according to $(X \oplus (Y \cdot (Z_1 \oplus Z_2)))$.

32. An apparatus as in claim 30, where the logic combiner comprises a MAJ logic combiner to combine at least four PN component codes according to $(X \cdot Y) \oplus (X \cdot Z_1) \oplus (X \cdot Z_2) \oplus (Y \cdot Z_1) \oplus (Y \cdot Z_2) \oplus (Z_1 \cdot Z_2)$.

33. An apparatus as in claim 27, where the apparatus is constructed as at least one Integrated Circuit (IC).

34. A program storage device readable by a machine, tangibly embodying a program of instructions executable by the machine to perform method steps for fast data decryption, the method comprising: determining a time slot number (TSN) by determining a receiver PN composite code minor epoch, where the receiver PN composite code minor epoch comprises at least two receiver PN component code epochs, where determining the receiver PN composite code minor epoch further comprises determining the receiver PN composite code minor epoch with sufficient lead time to identify the TSN associated with encrypted data to be decrypted; and determining the receiver TSN relative to determining the receiver PN composite code minor epoch; and
decrypting encrypted data associated with the TSN relative to the receiver PN composite code, where decrypting comprises decrypting in accordance with the TSN.

35. A program storage device as in claim 34, where decrypting the encrypted data in accordance with the TSN further comprises translating the TSN to an integer variable e, where integer variable e is relatively prime to the product of $(X-1)(Y-1)$, where X and Y are code lengths of at least two receiver PN component codes, respectively, computing an integer d, according to: $e*d=1[\bmod(X-1)(Y-1)]$, where integer d is the multiplicative inverse of integer e in modulo $(X-1)(Y-1)$; and decrypting the encrypted data according to: clear data=$(\text{encrypted data})^d \pmod{X*Y}$.

36. A program storage device readable by a machine, tangibly embodying a program of instructions executable by the machine to perform method steps for fast data encryption, the method comprising determining a time slot number (TSN) by determining a transmitter PN composite code minor epoch, where the transmitter PN composite code minor epoch comprises at least two transmitter PN component code epochs; determining a transmitter TSN relative to determining the transmitter PN composite code minor epoch; and
encrypting data associated with the TSN in accordance with the TSN.

37. A program storage device as in claim 36, where encrypting data in accordance with the TSN further comprises translating the TSN to an integer variable e, where integer variable e is relatively prime to the product of $(X-1)(Y-1)$, where X and Y are code lengths of at least two transmitter PN component codes, respectively; and encrypting the clear data according to: encrypted data=$(\text{clear data})^e \pmod{X*Y}$.

* * * * *

UNITED STATES PATENT AND TRADEMARK OFFICE
CERTIFICATE OF CORRECTION

PATENT NO.       : 7,200,233 B1                                    Page 1 of 1
APPLICATION NO.  : 10/316655
DATED            : April 3, 2007
INVENTOR(S)      : Merle L. Keller et al.

It is certified that error appears in the above-identified patent and that said Letters Patent is hereby corrected as shown below:

IN THE CLAIMS:

Column 15, line 17, "$(X \oplus (Y \cdot (Z_1 \ominus Z_2)))$" should be deleted and -- $(X \oplus (Y \cdot (Z_1 \oplus Z_2)))$ -- should be inserted.

Signed and Sealed this

Twenty-sixth Day of June, 2007

JON W. DUDAS
*Director of the United States Patent and Trademark Office*